United States Patent [19]

Kerkar et al.

[11] Patent Number: 5,618,344
[45] Date of Patent: Apr. 8, 1997

[54] CEMENT COMPOSITION

[75] Inventors: Awdhoot V. Kerkar, Columbia, Md.; Neal S. Berke, Chelmsford, Mass.; Michael P. Dallaire, Dover, N.H.

[73] Assignee: W. R. Grace & Co.-Conn., New York, N.Y.

[21] Appl. No.: 554,579

[22] Filed: Nov. 6, 1995

Related U.S. Application Data

[63] Continuation-in-part of Ser. No. 398,719, Mar. 6, 1995, abandoned.

[51] Int. Cl.$^6$ ............................................. C04B 24/02
[52] U.S. Cl. .................... 106/823; 106/672; 106/677; 106/724; 106/802; 106/820
[58] Field of Search ...................... 106/672, 724, 106/802, 820, 823, 677; 568/613, 626, 671, 607, 700, 840

[56] References Cited

U.S. PATENT DOCUMENTS

| | | | |
|---|---|---|---|
| 4,547,223 | 10/1985 | Goto et al. | 106/802 |
| 4,946,904 | 8/1990 | Akimoto et al. | 106/810 |
| 5,142,036 | 8/1992 | Akimoto et al. | 106/823 |
| 5,181,961 | 1/1993 | Umaki et al. | 106/724 |
| 5,223,036 | 6/1993 | Koyata et al. | 106/810 |
| 5,326,397 | 7/1994 | Abdelrazig et al. | 106/727 |
| 5,362,323 | 11/1994 | Koyata et al. | 106/802 |
| 5,413,634 | 5/1995 | Shawl et al. | 106/696 |

*Primary Examiner*—Anthony Green
*Attorney, Agent, or Firm*—Howard J. Troffkin

[57] ABSTRACT

A cement admixture composed of a mixture of certain lower alkyl ether oxyalkylene adducts with certain higher alkylene diols to provide cement compositions of mortar and concrete which inhibit drying shrinkage while permitting substantial air entrainment and enhanced compressive strength.

10 Claims, No Drawings

CEMENT COMPOSITION

This application is a continuation in part application of U.S. application Ser. No. 08/398,719 filed Mar. 6, 1995 and now abandoned.

BACKGROUND OF THE INVENTION

The present invention is directed to a cement admixture composition capable of causing the combined effects of inhibiting drying shrinkage of cement compositions while permitting substantial air entrainment to be imparted thereto. The present invention further provides an improved cement composition structural product and a method of forming same.

Specifically, the present invention is directed to a cement admixture composed of a synergistic combination of certain monoalkyl ether alkylene oxide adducts and alkylene glycols, as fully described hereinbelow.

Hydraulic cement compositions, such as mortar (cement, small aggregate, e.g. sand, and water), or concrete (cement, small aggregate, large aggregate, e.g. crushed stone and water), have certain properties which substantially affect their durability. These properties include shrinkage which normally occurs during drying of the cement composition and the amount of air entrained in the resultant cast cement composition's structure.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_{2-3}$ alkylene radicals and n is 1–10, as shrinkage reducing additives for cement. Similarly, U.S. Pat. No. 5,147,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or aromatic group terminated oxyethylene and/or oxypropylene repeating chain compounds.

The freeze-thaw pressures encountered by conventional hydraulic cement structures on a micro-scale (including crack phenomenon) is due to seepage of water into the porous cement structure where it resides to exert deteriorating pressure under freeze-thaw conditions. In order to prevent the loss of durability due to this phenomenon, it is common practice to incorporate small amounts of agents capable of causing the entrainment of fine air voids in the hardened hydraulic cement composition structure (Air entraining agents or AE agents). These air voids (normally 3–10, preferably 4–8 volume percent) provide empty space for expansive ice crystals to grow into relieving the pressure of water expansion under freeze-thaw conditions.

While oxyalkylene compounds provide a degree of shrinkage inhibition to cement structures, they have been known to cause a deactivation of conventional air entraining agents and, therefore, cause such treated cement structures to have an undesired low degree of air entrainment and/or require a very high dosage of AE agent (which has many disadvantages from a practical and economic standpoint). It is known that air entrainment is desired to aid in permitting the cast cement structure to withstand the compression/expansion forces encountered. The alkylene oxide adducts described above do not permit the structure to have sufficient air entrainment, as required, to provide a structure capable of withstanding compressive/expansive forces and, thereby, extend the structure's useful life. For example, U.S. Pat. No. 3,663,251 shows, by comparative examples, that the inclusion of a polypropylene glycol causes a reduction of the air entrainment provided by the cement being treated with an agent composed of sulfite waste liquor. Further, Canadian Patent 967,321 suggests that polyoxyalkylene glycols as well as their esters, ethers and mixture cause a reduction in foaming in cementitious compositions.

It is highly desired to provide a cement admixture which is capable of inhibiting drying shrinkage of structural cement compositions without causing a reduction in the ability of conventional air entraining agents to impart sufficient air thereto.

SUMMARY OF THE INVENTION

The present invention is directed to a cement admixture, a cement having the admixture incorporated therein and a method of forming an improved cement structural composition, which is capable of inhibiting drying shrinkage without detracting from the ability to substantially maintain air void content of the treated structure. The admixture comprises a synergistic mixture of oxyalkylene ether adduct having the Formula (I), $RO(AO)_nH$ wherein A is selected from $C_2$–$C_4$ alkylene groups, n has a value of 1 to 5 and R is a $C_1$–$C_7$ alkyl or $C_5$–$C_6$ cycloalkyl group; in combination with certain higher alkylene diols having the Formula (II), $HOBOH$ wherein B is a $C_5$–$C_{10}$ alkylene group.

DETAILED DESCRIPTION

It has been unexpectedly found that when the specific combination of oxyalkylene adducts and alkylene diols are used, one attains the desired combination of enhanced inhibition of drying shrinkage of the treated cement structure while providing the ability to impart air entrainment using known AE agents thereto.

The present invention is specifically directed to a combination of certain alkyl ether oxyalkylene adducts and certain higher alkylene diols as fully described hereinbelow.

The subject cement admixture requires the use of an alkyl ether oxyalkylene adduct represented by the formula $RO(AO)_nH$ (Formula I) wherein R represents a $C_1$–$C_4$ alkyl or a $C_5$–$C_6$ cycloalkyl, preferably a $C_3$–$C_5$ alkyl group. Examples of such R groups are methyl, ethyl, propyl, isopropyl, n-butyl, isobutyl, tertiary butyl, n-pentyl, isopentyl, cyclopentyl, cyclohexyl and the like. The preferred adducts have R groups of $C_3$–$C_5$ alkyl, such as propyl, isopropyl, n-butyl, t-butyl, isopentyl and the like. The most preferred adducts have R groups of butyl or cyclohexyl group. The symbol A in the above formula represents at least one $C_2$–$C_4$ alkylene group such as, for example,

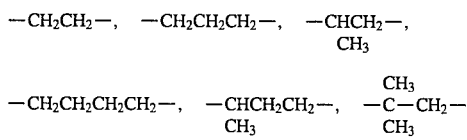

and the like and mixtures thereof; O represents an oxygen atom; n represents an integer of 1 to 5. The preferred compounds of these ether adducts are those having R represent a butyl group, A represent an ethylene or propylene and n is 2 or 3. The most preferred adduct is dipropylene glycol mono-t-butyl ether and tripropylene glycol mono-t-butyl ether.

It has now been found that certain higher alkylene diols, described below, when used in combination with the alkyl ether oxyalkylene adduct described above, frees the resultant admixture from inhibiting air entrainment to be established in the treated cement composition while providing enhanced shrinkage reduction to the treated cement structure.

The alkylene diols found useful in providing the synergistic combination of the present invention are represented by Formula II below $$HOBOH \qquad\qquad II$$

wherein B represents a $C_5$–$C_{10}$ straight or branched chain alkylene group such as, for example, pentylene, hexylene, octylene and the like.

The present unique combination of compound requires the use of an alkylene glycol, represented by the formula HOBOH (Formula II) where B represents a $C_5$–$C_{10}$ alkylene group, preferably a $C_5$–$C_8$ alkylene group. Examples of such glycols are 1,5-pentanediol, 1,4-pentanediol, 2-methyl-2,4-pentanediol, 1,7-heptanediol, 2,6-heptanediol and the like. The preferred diols are secondary and/or tertiary dihydroxyl $C_5$–$C_8$ alkanes which are represented by the formula $$\begin{array}{ccc} & R & R \\ R'\!-\!C\!-\!(CH_2)_n\!-\!C\!-\!R' \\ & OH & OH \end{array} \qquad III$$

wherein each R represents hydrogen atom or a $C_1$–$C_2$ alkyl and each R' represents a $C_1$–$C_2$ alkyl group and n is an integer of 1 or 2. The most preferred compound is 2-methyl-2,4-pentanediol.

The subject cement admixture composition should contain component of Formula I to component of Formula II or preferably Formula III in a weight ratio of from 1:1 to 5:1 and preferably from 2:1 to 4:1. The cement admixture may be neat or be composed of an aqueous solution of the admixture composition. An aqueous admixture composition preferably contains a combination of components in high concentrations of about 50 volume percent or greater although lesser concentrations may be suitable in certain instances.

The admixture composition of the present invention may be used with hydraulic cements suitable for structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The improved cement of the present invention is composed of a substantially uniform mixture of a hydraulic cement and the subject cement admixture composed of at least one component of Formula I with at least one component of Formula II or preferably Formula III, described above. The improved cement may be formed at any stage of the cement's formation or use, such as by applying the admixture to cement powder during the blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The admixture composition can be added separately or as part of the water of hydration. When the admixture is in the form of an aqueous solution, the water content of the solution should be calculated as part of the total water content of the cement composition.

The cement admixture of the present invention should be present in from about 0.1 to about 5, preferably about 0.5 to about 3 and most preferably from about 1 to about 3 weight percent based on the weight of the cement content of the above described improved cement or of the cement content of the cement composition ultimately being treated. The quantity of water used for setting the cement composition can vary within the weight ratios of water to cement of from 0.25:1 to 0.7:1, preferably 0.3:1 to 0.5:1. Aggregate, such as pebble, gravel, sand, pumice or fired perlite, as required, may be employed in conventional amounts.

Various conventional ingredients may be optionally used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors such as a sodium nitrate and calcium nitrite; water reducing agents, such as lignosulfonic acids and their salts, and derivatives, and high range water reducing agents, such as hydroxylated carboxylic acids and their salts, condensation products of naphthalenesulfonic acids and formalin, sulfonated melamine polycondensation products, amines and their derivatives, alkanolamines, and inorganic salts such as borates, phosphates, chlorides and nitrates; super plasticizers; and the like. The quantity of such an optional ingredient or ingredients is usually 0.05–6% by weight of the cement. When the optional conventional ingredients are made part of the admixture composition, the weight ratio of the combination of (a) plus (b) to other conventional ingredients may be from 0.01:1 to 100:1.

The cement compositions of the present invention preferably contain at least one compound or composition capable of imparting air entrainment to the resultant cement structure. Such air entraining agents are well known and include, for example, tall oil fatty acids and their esters, gum resins and rosins, sulfite liquors and the like. The air entraining agent can be used in amounts sufficient to impart from about 4 to 10 volume percent air voids in the resultant cement structure. Normally, the dosage may be from about 25 to $75 \times 10^{-4}$ percent by weight based on the cement content of the treated composition. The exact dosage needed for a particular agent to attain a particular degree of air can be readily determined. It has been unexpectedly found that the present cement admixture does not cause a substantial deactivation of conventional air entraining additive.

The treated cement composition having the cement admixture according to the invention may be applied in conventional ways. For example, it may be troweled, filled in forms, applied by spraying, or injected by means of a caulking gun. Hardening or curing of the concrete and the like may be by any of the air drying, wet air, water and heat-assisted (steam, autoclave, etc.) curing techniques. If desired, two or more such techniques may be combined. The respective curing conditions may be the same as in the past.

The addition of the cement admixture composition of the present invention to a cement will markedly reduce the drying shrinkage of the resulting cement composition (e.g. mortar and concrete) compared with that of untreated compositions or those utilizing only one of the components. The admixture according to the invention further does not inhibit the concrete's ability to entrain air.

The following examples are given for illustrative purposes only and are not meant to be a limitation on the invention as defined by the claims appended to this specification. All parts and percentages are by weight unless otherwise indicated. The term "S/S" means weight of solid additive based on weight of hydraulic cement.

EXAMPLE 1

A series of micro-concrete samples were prepared to determine the effect on air content by the subject cement admixture composed of a mixture of a monoalkyl ether alkylene oxide adduct (dipropylene glycol t-butyl ether) and an alkylene diol (2-methyl-2,4-pentanediol) in comparison to the use of each material alone.

The micro-concrete was formed by blending 800 parts Type I portland cement with a mixture of the following ASTM graded aggregates: 475 parts F-95 sand, 432 parts of C-109 sand, 432 pats of C-185 sand, and 821 parts of 15-S sand. The dry blending was conducted in a Hobart mixer for about two minutes to attain a uniform blend having an aggregate to cement ratio of 2.7. To the blend was added 400 parts of water containing an air entraining agent of a tall oil fatty acid ester (Darex II). The water to cement ratio was 0.47. The blend was mixed in the Hobart mixer for about 10 minutes to provide a micro-concrete.

The above was repeated except that the water of hydration contained the materials indicated in Table I below. The ratio of total liquid to cement (L/C) was maintained constant. The amount of water was reduced to account for the liquid admixture. The air content and initial slump were measured according to ASTM C-185 and ASTM C-143, respectively.

TABLE I

| | Additives | | | | | | | | | |
|---|---|---|---|---|---|---|---|---|---|---|
| Sample | Adduct* | Dosage % | Diol* | Dosage % | W/C | L/C | AE | Dosage % × 10$^{-4}$ | Slump cm | Air % |
| 1 | — | — | — | — | 0.50 | 0.5 | Darex II | 32 | 10.7 | 10.7 |
| 2 | — | — | — | — | 0.50 | 0.5 | Darex II | 50 | 10.6 | 14.2 |
| 3 | — | — | 2MPD | 1.5 | 0.47 | 0.5 | Darex II | 50 | 10.7 | 15.2 |
| 4 | DPTB | 1.5 | — | — | 0.47 | 0.5 | Darex II | 50 | 10.3 | 8.4 |
| 5 | DPTB | 1.2 | 2MPD | 0.3 | 0.47 | 0.5 | Darex II | 50 | 10.2 | 10.0 |
| 6 | DPTB | 1.5 | 2MPD | 0.3 | 0.47 | 0.5 | Darex II | 50 | 10.7 | 9.4 |

*DPTB = dipropylene glycol t-butyl ether adduct
2MPD = 2-methyl-2,4-pentanediol

The above results show that cement mixes which contained conventional dosages of AE agent (Sample 1) provide the desired 10% air. A second blank having the higher dosage of AE used in the remaining samples provided 14.2% air. When DPTB is added, the air content drops to 8.4% (a 45% decrease). The combination of adduct and glycol provides the desired 10% air content value.

EXAMPLE 2

Concrete mixes were formulated with a mix design of fine aggregate equal to 1330 pounds per cubic yard West Sand, 1850 pounds per cubic yard Wrentham Crushed Stone (ASTM c-cc Grade 67), 517 pounds per cubic yard of Portland cement factor and a water (or water and indicated liquid additives) to cement ratio of 0.44. Concrete contained 0.4% by weight based on cement of a naphthalene sulfonate water reducing agent (WRDA-19). The concrete mixtures were proportioned by the volumetric method according to American Concrete Institute guidelines. The concrete was mixed according to ASTM C-192 ("Making and Curing Concrete Specimens in the Laboratory"). The amount of AE agent added was sufficient to maintain air content at a substantially constant value for all formed samples. Plastic concrete tests included slump according to ASTM C-143; and plastic air according to ASTM C-231.

Samples were formed with only an air entraining agent (a gum rosin product sold under the trademark Daravair M; with air entraining agent and either t-butyl ether dipropylene glycol adduct ("Adduct") or 2-methyl-2,4-petanediol ("Diol") or both. The plastic air content was measured for each sample and the ability to impart air by the AE agent was determined by the following equation taking into account the dosage of AE agent and the amount of entrapped air in the blanks without any agent. The air efficiency of the AE agent used was calculated in a manner to normalize the results. The air efficiency value was attained by the ratio in which the numerator is the air content value of the tested sample minus 2 (the percentage of a sample having no AE or other agent) divided by the dosage of AE agent used and the denominator is the air content value of the blank minus 2 divided by the dosage of AE agent used in the blank, all multiplied by one hundred. Shrinkage was determined for each sample and reported in Table II.

The results are shown in Table II below. The ability of an air entraining agent to impart air to a concrete is based on the values of Samples A which did not contain an adduct or a diol. Sample B shows that the use of adduct alone impedes the AE agent to impart air and provided only 45% air efficiency. Samples C and D show that the use of diol alone with the AE agent used therein causes the AE agent to be super sensitive and not suitable for commercial use.

In contrast, Samples E and F show that when adduct and glycol are used in combination, as required by the present invention, one synergistically achieved well-controlled air efficiency in combination with substantially no shrinkage of the treated concrete.

TABLE II

| Sample | Adduct % | Diol (%) | AE Agent (oz/ 100 lbs) | Slump (inch) | Air % | Air Efficiency | Shrinkage 28 days % |
|---|---|---|---|---|---|---|---|
| A | — | — | 1.00 | 3 | 6 | 100 | 0.045 |
| B | 1.5 | — | 3.00 | 5.5 | 7.5 | 45 | 0.006 |
| C | — | 0.5 | 0.27 | 4.75 | 4.5 | 233 | 0.016 |
| D | — | 0.3 | 0.50 | 4.25 | 7.0 | 250 | 0.027 |
| E | 1.0 | 0.5 | 1.05 | 6.0 | 6.4 | 105 | 0.0014 |
| F | 1.2 | 0.3 | 1.6 | 5.0 | 6.8 | 75 | 0.0014 |

What is claimed is:

1. An improved cement admixture which inhibits drying shrinkage while substantially maintaining air void content of a treated cement composition comprising a mixture of (a) at least one alkyl ether oxyalkylene adduct represented by the formula $RO(AO)_nH$ wherein A is a $C_2$–$C_4$ alkylene radical, O is oxygen, R is a $C_1$–$C_7$ alkyl or $C_5$–$C_6$ cycloalkyl group, and n is an integer of 1 to 5; in combination with (b) an alkylene diol represented by the formula HOBOH wherein B is selected from a $C_5$–$C_{10}$ alkylene group and wherein the weight ratio component (a) to component (b) of the mixture is 1:1 to 5:1.

2. The admixture of claim 1 wherein component (b) is selected from $C_5$–$C_8$ alkylene diols having secondary or tertiary hydroxy groups or mixtures thereof.

3. The admixture of claim 1 wherein R represents a butyl group, A represents ethylene, propylene or mixtures thereof and n represents 2 or 3.

4. The admixture of claim 2 wherein R represents a butyl group, A is selected from ethylene, propylene or mixtures thereof, and n represents 2 or 3.

5. The admixture of claim 2 wherein component (b) is a $C_6$ alkanediol having secondary or tertiary hydroxyl groups or mixtures thereof.

6. The admixture of claim 3 wherein component (b) is a $C_6$ alkanediol having secondary or tertiary hydroxyl groups or mixtures thereof.

7. An improved cement composition comprising a hydraulic cement and from 0.1 to 5 weight percent of the admixture of claim 1, 2, 3, 4, 5 or 6.

8. The cement composition of claim 7 which further contains an effective amount of a cement air entraining agent to cause at least about 3 volume percent air in a treated and cured cement composition.

9. The cement composition of claim 8 which further contains sand, aggregate and water.

10. A method of inhibiting drying shrinkage of a cast hydraulic cement structure while substantially maintaining air void content therein comprising forming an unset cement composition comprising a hydraulic cement and from 0.1 to 5 weight percent of the admixture of claim 1, 2, 3, 4, 5, or 6, introducing a cement air entraining agent in an effective amount to provide at last about 3 volume percent air in the cured composition; casting the unset cement composition into a shape; and permitting said composition to cure.

* * * * *

UNITED STATES PATENT AND TRADEMARK OFFICE
CERTIFICATE OF CORRECTION

Page 1 of 2

PATENT NO. : 5,618,344
DATED : April 8, 1997
INVENTOR(S) : Kerkar et al

It is certified that error appears in the above-indentified patent and that said Letters Patent is hereby corrected as shown below:

At column 3, lines 20-25, please delete the formulas and insert therefor $$-CH_2CH_2-, \quad -CH_2CH_2CH_2-, \quad -\underset{\underset{CH_3}{|}}{C}HCH_2-,$$

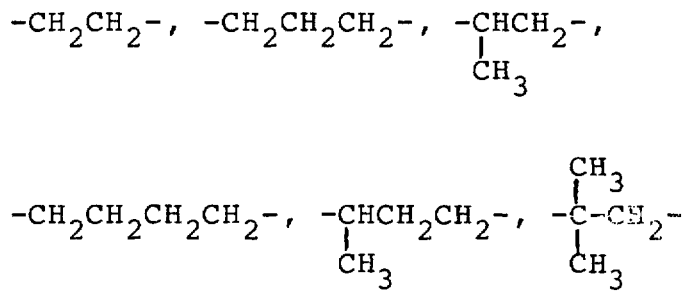

At column 3, line 60, please delete the formula and insert therefor

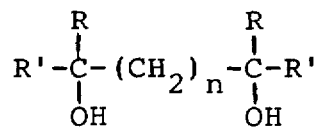

UNITED STATES PATENT AND TRADEMARK OFFICE
CERTIFICATE OF CORRECTION

PATENT NO. : 5,618,344
DATED : April 8, 1997
INVENTOR(S) : Kerkar, et. al.

It is certified that error appears in the above-indentified patent and that said Letters Patent is hereby corrected as shown below:

At column 8, line 35, please delete "last" and insert therefor --least--.

Signed and Sealed this

Eighteenth Day of November 1997

Attest:

BRUCE LEHMAN

*Attesting Officer*   *Commissioner of Patents and Trademarks*